United States Patent [19]

Fejer

[11] 4,275,562
[45] Jun. 30, 1981

[54] COMPOSITE ENERGY PRODUCING GAS TURBINE

[75] Inventor: Andrew A. Fejer, Oak Park, Ill.

[73] Assignee: Institute of Gas Technology, Chicago, Ill.

[21] Appl. No.: 64,113

[22] Filed: Aug. 6, 1979

[51] Int. Cl.³ .................. F01K 25/00; F02C 1/10; F02C 6/04
[52] U.S. Cl. .......................... 60/648; 60/650; 60/682
[58] Field of Search ............... 60/648, 650, 682; 6/39.04, 39.17

[56] References Cited

U.S. PATENT DOCUMENTS

| | | | |
|---|---|---|---|
| 2,453,928 | 11/1948 | Oechslin | 60/682 |
| 2,632,297 | 3/1953 | Ogston | 60/39.17 |
| 3,201,941 | 8/1965 | LaFleur | 60/682 |
| 3,724,214 | 4/1973 | Bryant | 60/648 |
| 4,042,809 | 8/1977 | Shetler | 60/648 |

Primary Examiner—James J. Gill
Attorney, Agent, or Firm—Thomas W. Speckman

[57] ABSTRACT

A composite energy producing gas turbine system which may readily provide pre-selected amounts of composite outputs including shaft energy, heat at pre-selected temperatures and additionally, if desired, cooling at pre-selected temperatures. The physical structure of the system includes one or more compressors, heaters, turbines and thermal heat exchangers.

13 Claims, 4 Drawing Figures

COMPOSITE ENERGY PRODUCING GAS TURBINE

BACKGROUND OF THE INVENTION

1. Field of the Invention

This invention relates to a composite energy producing gas turbine system which, in addition to providing shaft power normally associated with gas turbines, provides heat energy for use as process heat. In another embodiment, the apparatus and process of this invention provides shaft power, process heat and cooling output from the system. The process heat and the cooling may be provided at pre-selected temperatures resulting in very high energy efficient utilization of the system. Industrial complexes requiring electricity, heat and cooling functions, each of which are normally supplied by a different device, may utilize a single composite energy producing gas turbine system according to this invention to provide high combined fuel economy of the industrial plant.

2. Description of the Prior Art

Utilization of conventional gas turbines for shaft power output functions, such as electrical generation, are well known in the art. U.S. Pat. No. 3,867,811 teaches inter-cooling and regeneration for power modulation of a gas turbine by variation of the inlet temperature of the working fluid to the compressor. For the purpose of inter-cooling, the compressor is split into two stages and the temperature is reduced between stages in a heat exchanger. This reduces the power required to drive the compressor and thereby increases the net power of the engine. However, fuel economy is decreased due to the loss of heat. The U.S. Pat. No. 3,867,811 teaches enhancement of the effect of inter-cooling by use of a low temperature refrigerant. The U.S. Pat. No. 3,867,811 also teaches utilization of two turbine sections and passing working fluid from the first turbine into a heat exchanger where the working fluid is preheated as it passes from the compressor discharge to a heater, thereby replacing heat lost by inter-cooling. By these features, the internal thermodynamics of the gas turbine system, itself, are improved, but overall system energy requirements are increased.

SUMMARY OF THE INVENTION

This invention relates to an apparatus and process for composite energy production by a gas turbine system. The gas turbine system of this invention provides shaft power which may be utilized for generating electricity, heat which may be utilized as process heat and cooling which may be utilized as process cooling. The apparatus and process of this invention provides for heat and cooling output from the composite energy producing gas turbine system at pre-selected temperatures which may be varied to meet the varying industrial requirements.

The inefficiency of storing electrical power and both hot and cold thermal energy is well recognized. Thus, there is a great advantage to production of electricity, heat and cooling, to closely follow the needs of an industrial plant.

It is an object of this invention to provide a composite energy producing gas turbine system which may readily provide pre-selected amounts of composite outputs including shaft energy, heat at pre-selected temperatures and additionally, if desired, cooling at pre-selected temperatures.

It is an object of this invention to increase the overall energy utilization of an industrial plant by use of a single composite energy producing gas turbine system.

It is yet another object of this invention to provide a process for supplying shaft power and process heat in a pre-selected ratio and at a pre-selected temperature to an industrial plant.

It is still another object of this invention to provide a process for supplying electrical energy, heat energy, and cooling energy, the proportions of which may be readily changed to promptly meet demand changes.

BRIEF DESCRIPTION OF THE DRAWINGS

Further objects and advantages of this invention will become apparent upon reading the description and in the drawings showing preferred embodiments wherein.

DESCRIPTION OF THE PREFERRED EMBODIMENTS

Figure 1:
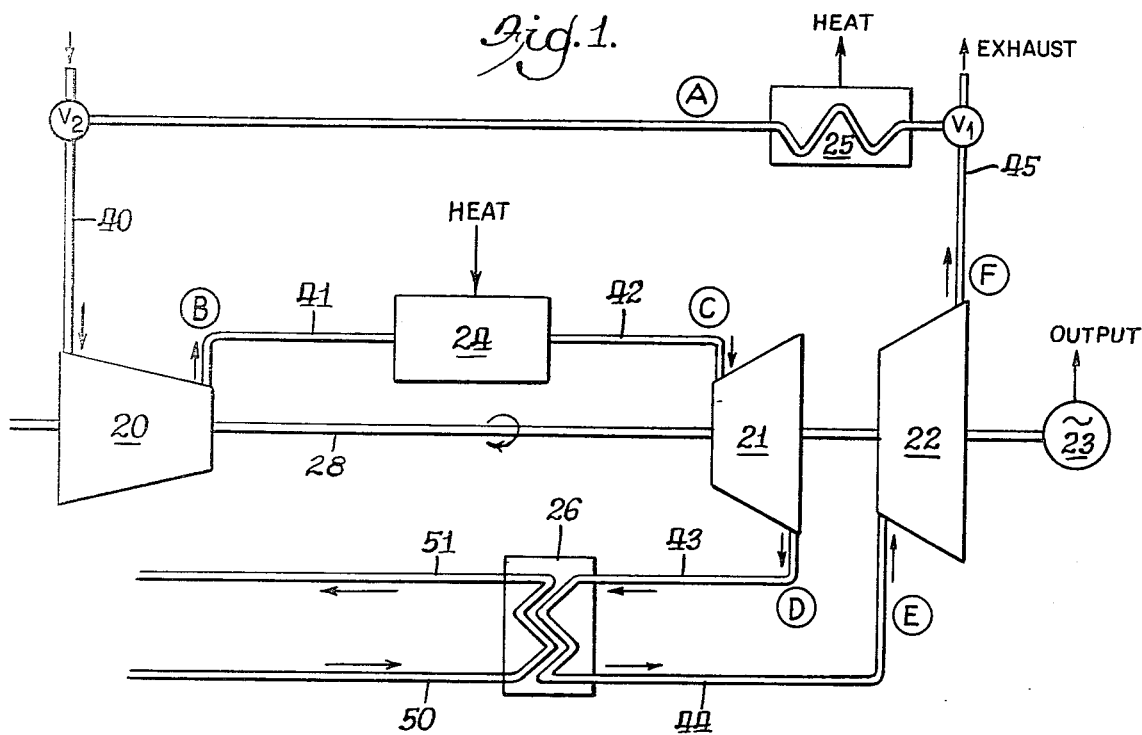
FIG. 1 is a schematic layout representation of one embodiment of a composite energy producing gas turbine system according to this invention.

FIG. 1 showing a schematic layout of a composite energy producing gas turbine system having shaft power and process heat output is simplified by not including auxiliary equipment such as fuel pumps and the like, the placement and use of which will be obvious to one skilled in the art after the following description. Any suitable working fluid for conventional gas turbines may be used, such as air, nitrogen and helium. Air is a preferred working fluid for the gas turbine system of this invention. The working fluid is introduced to compressor means 20 through compressor entrance conduit 40, is compressed within compressor means 20 and leaves via compressor exit conduit 41. Compressor means 20 may be multiple compressors or staged compressors to obtain the desired degree of compression and the concomitant temperature. It is usually desired that the pressure of the working fluid upon leaving the compressor means be in the order of about 10 to about 20 times the pressure of the working fluid at the entrance to the compressor. This compression is indicated on the thermodynamic dynamic diagram, FIG. 2, by line A-B. The compressed working fluid is heated by heating means 24 to temperatures suitable for introduction to a high temperature turbine, preferably over 2000°R. To attain the desired high temperatures, heating means 24 is preferably a combustion chamber into which fuel is supplied for combustion and the resulting combustion gas is passed in heat exchange to the working fluid and the heated and compressed working fluid is passed through high temperature turbine entrance conduit 42 to high temperature turbine 21. The effect of heater means 24 upon the working fluid is shown in the thermodynamic diagram, FIG. 2, as line B-C.

The working fluid is expanded by passage through high temperature turbine 21 providing shaft power to shaft 28 which is common to compressor means 20, low temperature turbine means 22 and shaft output means 23. The thermodynamic representation of the expansion of working fluid through high temperature turbine 21 is shown by line C-D in FIG. 2. The working fluid exhaust from high temperature turbine means 21 is passed by high temperature turbine exit conduit 43 to heat exchanger means 26. Heat exchanger means 26 provides thermal exchange between the working fluid and a process fluid in heat exchange relation therewith supplied by process fluid entrance conduit 50 and removed by process fluid exit conduit 51. The extraction of process heat from the working fluid is represented in the thermodynamic diagram of FIG. 2 by line D-E. The working fluid, after passing in desired thermal exchange with process fluid in heat exchanger means 26, passes to low temperature turbine entrance conduit 44 for introduction to low temperature turbine means 22. The working fluid is further expanded through low temperature turbine means 22, the expansion being reflected by line E-F in FIG. 2.

The working fluid may be exhausted from the system from low temperature turbine means 22, but it is preferred to operate a closed cycle system as shown in FIG. 1 wherein low temperature turbine exit conduit 45 transports the working fluid from low temperature turbine means 22 to cooling means 25. The working fluid may be exhausted from the system by valve $V_1$ and make up working fluid added by valve $V_2$. Cooling means 25 may be an ambient temperature cooling means or may use the heat removed for additional process heat if the temperatures are satisfactory for the processes involved. Cooling of working fluid in cooling means 25 is represented by line F-A of FIG. 2. The working fluid is then in condition for recycle to compressor means 20.

It is apparent that one feature of this invention is the extraction of usable process heat between multiple turbines. While two turbines have been shown in series in FIG. 1, it is readily apparent that an additional number of multiple turbines may be used, such as three or four, to provide additional process heat temperature levels. It is readily seen that the objective of this invention of providing shaft power and process heat for an industrial plant from a single composite energy producing gas turbine system is achieved by the apparatus as set forth in FIG. 1 in accordance with the process as described in FIG. 2.

Figure 3:
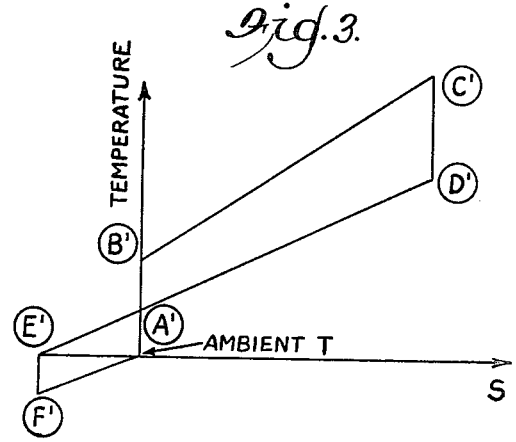
FIG. 3 is a thermodynamic diagram of another process of this invention providing shaft power, process heat and process cooling output using the modification of the gas turbine system as shown in FIG. 4.
Figure 4:
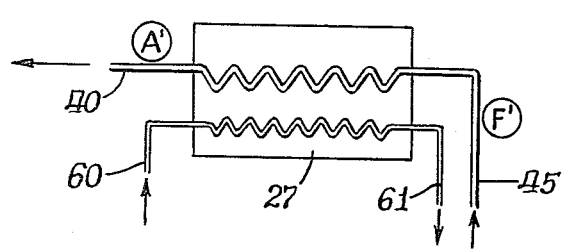
FIG. 4 is a schematic layout modification of the gas turbine system shown in FIG. 1 additionally providing cooling output.

Process cooling, in addition to shaft power and process heat output, may be provided by the apparatus as generally shown in FIG. 1 substituting refrigerant heat exchange means 27, as shown in FIG. 4, for cooling means 25, as shown in FIG. 1, at the output of the low temperature turbine. Refrigerant heat exchange means 27 passes working fluid between low temperature turbine exit conduit 45 and compressor entrance conduit 40 in heat exchange relation with process cooling fluid supplied by refrigerant heat exchange means entrance conduit 60 and returned to the process by refrigerant exit conduit 61. Refrigerant heat exchange means 27 warms the working fluid while cooling the refrigerant. The thermodynamic process cycle is shown in FIG. 3 wherein the prime points correspond to the same letter positions as shown in FIG. 1. It is seen from FIG. 3 that the working fluid should be cooled by process heat exchange means 26 to about ambient temperatures so that expansion of the working fluid in passing through low temperature turbine means 22 results in sub-ambient temperatures providing cooling of refrigerant in heat exchange relation in refrigerant heat exchange means 27.

Throughout this description and claims, the terms "process heat" and "process cooling" are used to mean supply of heat and supply of cooling, respectively, for any desired use, such as in chemical processes, air conditioning and the like. Likewise, shaft power output may be converted to electricity by means well known to the art, or shaft power may be used as such for other industrial purposes.

The physical details of the components of the system of this invention, including the compressor means, heater means, turbine means and thermal exchangers will, in view of this disclosure, be readily apparent to one skilled in the art. Also, variants of temperatures of the general thermodynamic diagrams shown in FIGS. 2 and 3 may be chosen by one of ordinary skill in the art to obtain the desired variations in component energy outputs and pre-selected output temperatures.

The following examples are set forth as illustrative and are not intended to limit this invention in any manner.

EXAMPLE 1

Figure 2:
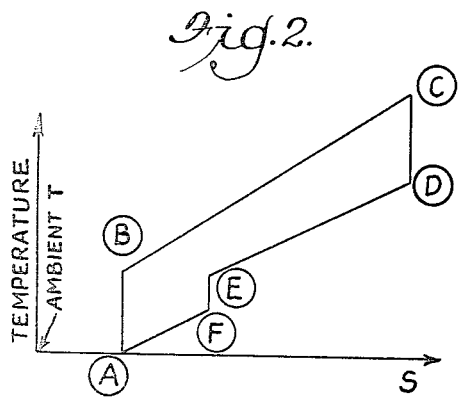
FIG. 2 is a thermodynamic diagram of one process of this invention providing shaft power and process heat output, using the gas turbine system shown in FIG. 1.

A composite energy producing gas turbine system as shown in FIG. 1 is operated on a thermodynamic cycle as shown in FIG. 2 wherein the pressure ratio, that is, $P_C/P_A$ equals $P_C/P_F$ equals 12; and the temperatures at the various points on the themodynamic diagram of FIG. 2 are as follows:

$T_A$ 520°R
$T_B$ 1060°R
$T_C$ 2120°R
$T_D$ 1600°R
$T_E$ 1039°R
$T_F$ 801°R

When the mass flow rate through low temperature turbine means 22 is one-half of the total mass flow rate, the shaft power output is 422 KW and the process heat output is 400 Btu/second, on a calculated basis. The temperature level of the process heat depends upon the location of the split between the turbine sections and, as shown above, the amount of process heat is determined by the fraction of total thermal energy in the working fluid that is being extracted between the multiple turbines.

EXAMPLE 2

A composite energy producing gas turbine system, basically as shown in FIG. 1, with the addition of refrigerant exchanger 27 as shown in FIG. 4, is operated on the thermodynamic cycle as shown in FIG. 3. Thus, an apparatus and process is provided which simultaneously provides shaft power, process heat and process cooling, thereby utilizing a high percentage of the energy presented to it. Using a compression ratio of 4 and the following temperatures:

$T_{A'}$ 520°R
$T_{B'}$ 1154°R
$T_{C'}$ 2250°R
$T_{D'}$ 1678°R
$T_{E'}$ 520°R
$T_{F'}$ 340°R shaft power produced with a heat input of 323 Btu per pound results in shaft power output 86 Btu per pound;

process heat 278 Btu per pound and refrigeration 41 Btu per pound, with a COP of 2.03.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for providing shaft power and process heat by use of a composite energy producing gas turbine system the steps comprising in sequence; compressing a turbine working fluid, further heating said working fluid to temperature for introduction to a high temperature turbine, partially expanding said working fluid through a high temperature turbine providing shaft power output from said system, passing said working fluid in heat exchange relation with a lower temperature process fluid providing heat output from said system, further expanding said working fluid through a low temperature turbine providing additional shaft power output from said system, adjusting the temperature of said working fluid to about ambient temperature, and recycling said working fluid to said compressing step.

2. The process of claim 1 wherein said temperature adjusting step comprises cooling by an ambient heat exchanger.

3. The process of claim 1 wherein said working fluid in said heat exchange relation with said process fluid comprises cooling said working fluid to about ambient temperature.

4. The process of claim 3 wherein the expansion of working fluid in said low temperature turbine comprises cooling said working fluid to sub-ambient temperatures and heating working fluid to about ambient temperature by passing it in thermal exchange with a refrigerant additionally providing cooling output from said system.

5. A composite energy producing gas turbine system providing shaft power and thermal output comprising in combination: compressor means having an entrance and exit conduit for working fluid; heating means for heating a working fluid for introduction to a high temperature gas turbine; high temperature gas turbine means having an entrance and exit conduit for working fluid and low temperature gas turbine means having an entrance and exit conduit for working fluid, said high temperature gas turbine means and said low temperature gas turbine means connected to a single shaft providing said shaft power output from said system; a heat exchanger means between said high temperature gas turbine and said low temperature gas turbine having thermal exchange means with working fluid removing thermal energy from said system providing said thermal output; and a working fluid in communication with said compressor, said heating means and said high and low temperature gas turbine means through conduit means comprising; conduit means in communication with said compressor means exit conduit for transmitting said working fluid to said heating means, conduit means in communication with said heating means and said high temperature gas turbine entrance conduit for transmitting said working fluid, conduit means in communication with said high temperature gas turbine exit conduit for working fluid and said heat exchanger means, and conduit means in communication with said heat exchanger means and said low temperature gas turbine entrance conduit for working fluid, said conduit means providing a single stream flow of said working fluid through said composite energy producing gas turbine system.

6. A composite energy producing gas turbine system providing shaft power and thermal output comprising in combination: compressor means having an entrance and exit conduit for working fluid; heating means for heating a working fluid for introduction to a high temperature gas turbine; high temperature gas turbine means having an entrance and exit conduit for working fluid and low temperature gas turbine means having an entrance and exit conduit for working fluid, said high temperature gas turbine means and said low temperature gas turbine means connected to a single shaft providing said shaft power output from said system; a heat exchanger means between said high temperature gas turbine and said low temperature gas turbine having thermal exchange means with working fluid removing thermal energy from said system providing said thermal output; a second heat exchange means between said low temperature gas turbine means exit conduit and said compressor means entrance conduit; and a working fluid in communication with said compressor, said heating means and said high and low temperature gas turbine means and said second exchange means through conduit means comprising; conduit means in communication with said compressor means exit conduit for transmitting said working fluid to said heating means, conduit means in communication with said heating means and said high temperature gas turbine entrance conduit for transmitting said working fluid, conduit means in communication with said high temperature gas turbine exit conduit for working fluid and said heat exchanger means, conduit means in communication with said heat exchanger means and said low temperature gas turbine entrance conduit for working fluid, conduit means in communication with said low temperature gas turbine exit conduit for working fluid and said second heat exchange means inlet and conduit means in communication with said second heat exchange means outlet and said compressor means entrance conduit for recycle of said working fluid.

7. The composite energy producing gas turbine system of claim 6 wherein said second heat exchange means comprises ambient heat exchange means for cooling said working fluid by thermal exchange with ambient temperatures.

8. The composite energy producing gas turbine system of claim 7 wherein said shaft is in communication with the rotor shaft of electrical generator providing said shaft power output in the forms of electricity.

9. The composite energy producing gas turbine system of claim 8 wherein said heat exchanger means between said high temperature and low temperature turbines is in thermal exchange relation with a process fluid providing process heat output.

10. The composite energy producing gas turbine system of claim 6 wherein said second heat exchange means comprises refrigerant heat exchange means for warming said working fluid by thermal exchange with a refrigerant additionally providing cooling output from said system.

11. The composite energy producing gas turbine system of claim 10 wherein said shaft is in communication with the rotor shaft of electrical generator providing said shaft power output in the form of electricity.

12. The composite energy producing gas turbine system of claim 11 wherein said heat exchanger means between said high temperature and low temperature turbines is in thermal exchange relation with a process fluid providing process heat output.

13. A process for providing shaft power and process heat by use of a composite energy producing gas turbine system comprising in sequence the steps; compressing a turbine working fluid, further heating said working fluid to temperature for introduction to a high temperature turbine, partially expanding said working fluid through a high temperature turbine providing shaft power output from said system, passing said working fluid in heat exchange relation with a lower temperature process fluid providing heat output from said system, further expanding said working fluid through a low temperature turbine providing additional shaft power output from said system, said working fluid passing in a single stream through said sequence of steps.

* * * * *